United States Patent
Manley et al.

(10) Patent No.: US 10,319,011 B2
(45) Date of Patent: Jun. 11, 2019

(54) SYSTEM AND METHOD FOR ENABLING GLOBAL AND REMOTE FLASH SALE OR DAILY DEAL COMMERCE THROUGH UNSECURED ELECTRONIC CHANNELS

(75) Inventors: Joshua Manley, Gilbert, AZ (US); Cory Mercurio, Chandler, AZ (US)

(73) Assignee: ReplyBuy, Inc., Gilbert, AZ (US)

( * ) Notice: Subject to any disclaimer, the term of this patent is extended or adjusted under 35 U.S.C. 154(b) by 0 days.

(21) Appl. No.: 13/192,372

(22) Filed: Jul. 27, 2011

(65) Prior Publication Data
US 2012/0030048 A1 Feb. 2, 2012

Related U.S. Application Data

(60) Provisional application No. 61/368,142, filed on Jul. 27, 2010.

(51) Int. Cl.
| | | |
|---|---|---|
| G06Q 30/00 | (2012.01) | |
| G06Q 30/06 | (2012.01) | |
| G06Q 20/02 | (2012.01) | |
| G06Q 20/32 | (2012.01) | |

(52) U.S. Cl.
CPC ......... *G06Q 30/0613* (2013.01); *G06Q 20/02* (2013.01); *G06Q 20/322* (2013.01); *G06Q 30/06* (2013.01); *G06Q 30/0601* (2013.01); *G06Q 30/0641* (2013.01)

(58) Field of Classification Search
CPC ...... G06Q 30/016; G06Q 30/02; G06Q 30/06; G06Q 30/0605; G06Q 30/00; G06Q 30/0251; G06Q 30/0253; G06Q 30/0255; G06Q 30/0601; G06Q 30/0613; G06Q 30/0641; G06Q 20/02; G06Q 20/322
USPC .............................................. 705/26.1, 27.1
See application file for complete search history.

(56) References Cited

U.S. PATENT DOCUMENTS

| | | | | |
|---|---|---|---|---|
| 7,379,920 | B2 * | 5/2008 | Leung | G06Q 20/20 |
| | | | | 705/50 |
| 7,979,316 | B2 * | 7/2011 | Coelho | G06Q 20/10 |
| | | | | 705/26.1 |
| 8,255,288 | B1 * | 8/2012 | Gupta et al. | 705/26.41 |
| 8,447,700 | B2 * | 5/2013 | Yuen et al. | 705/75 |
| 8,577,804 | B1 * | 11/2013 | Bacastow | G06Q 20/027 |
| | | | | 235/380 |
| 2002/0060246 | A1 * | 5/2002 | Gobburu | G06Q 20/04 |
| | | | | 235/462.46 |
| 2004/0024682 | A1 | 2/2004 | Popovitch | |

(Continued)

OTHER PUBLICATIONS

"Mobile Device Security Using Transient Authentication", by Anthony J. Nicholson, Mark D. Corner, and Brian D. Noble, IEEE Transactions on Mobile Computing, vol. 5, No. 11, Nov. 2006. (Year: 2006).*

(Continued)

*Primary Examiner* — Anne M Georgalas
(74) *Attorney, Agent, or Firm* — DLA Piper LLP (US)

(57) ABSTRACT

A system and method for enabling global and remote flash sale or daily deal commerce through unsecured electronic channels are provided. The system provides an innovative and new standard that not only enhances consumer convenience but also solves a large shortcoming by providing customers an alternative to online electronic purchasing for these types of offers. The system and method allows customers to receive and instantly purchase special offers in an entirely off-line fashion.

13 Claims, 7 Drawing Sheets

(56) References Cited

U.S. PATENT DOCUMENTS

| | | |
|---|---|---|
| 2004/0153374 A1 | 8/2004 | Nelson |
| 2005/0021982 A1* | 1/2005 | Popp .................. G06O 20/341 |
| | | 713/184 |
| 2005/0187873 A1* | 8/2005 | Labrou ................ G06Q 20/02 |
| | | 705/40 |
| 2006/0015435 A1 | 1/2006 | Nathanson |
| 2006/0206709 A1* | 9/2006 | Labrou ................ G06Q 20/18 |
| | | 713/167 |
| 2007/0094688 A1 | 4/2007 | Briscoe |
| 2008/0270251 A1 | 10/2008 | Coelho et al. |
| 2009/0063207 A1 | 3/2009 | Brodzeller |
| 2009/0128335 A1 | 5/2009 | Leung |
| 2009/0248543 A1* | 10/2009 | Nihalani ............... G06Q 30/02 |
| | | 705/26.1 |
| 2009/0287921 A1* | 11/2009 | Zhu ...................... G06Q 10/02 |
| | | 713/155 |
| 2010/0312587 A1 | 12/2010 | Benson et al. |
| 2011/0140834 A1* | 6/2011 | Kiliccote ............. G06F 21/606 |
| | | 340/5.2 |
| 2011/0185406 A1* | 7/2011 | Hirson .................. G06Q 20/32 |
| | | 726/6 |
| 2013/0046654 A1 | 2/2013 | Killoran |
| 2014/0188734 A1 | 7/2014 | Neuwirth |
| 2014/0207611 A1 | 7/2014 | Cleary et al. |

OTHER PUBLICATIONS

Webpage, Amazon TextBuyIt FAQ—Amazon Payments, https://payments.amazon.com/sdui/sdui/helpTab/Personal-Accounts/TextBuyIt-FAQ, printed Jul. 27, 2011 (2 pgs.).

* cited by examiner

SYSTEM AND METHOD FOR ENABLING GLOBAL AND REMOTE FLASH SALE OR DAILY DEAL COMMERCE THROUGH UNSECURED ELECTRONIC CHANNELS

PRIORITY CLAIMS/RELATED APPLICATIONS

This patent application claims the benefit under 35 USC 119(e) and 120 to U.S. Provisional Patent Application No. 61/368,142, filed on Jul. 27, 2010 and entitled "Method for Enabling Global and Remote Flash Sale or Daily Deal Commerce Through Unsecured Electronic Channels", the entirety of which is incorporated herein by reference.

FIELD

The disclosure relates generally to the mobile commerce and mobile security field, and more specifically to a new and useful method for enabling commerce through unsecured electronic channels.

BACKGROUND

Since approximately 1994 the practice of globally conducting remote commerce through the use of secure electronic channels has evolved into an established business practice. Today this business practice is performed using a standard implementation that necessitates several technical requirements of the businesses wishing to facilitate these global remote transactions, as well of as the customers who wish to purchase products or services in this fashion. While there are many widely used tactics and accepted fundamentals to this established practice, the current implementation for conducting remote electronic commerce including technical delivery, purchasing and the status quo customer checkout process available to businesses and consumers lacks significant innovation and enhanced capability.

The sales process known as "one deal a day, daily deal, real time buying, flash shopping", etc., through which consumers are notified of a special deal they may purchase online, has evolved over the past six years into a now well-established business practice. This recognized way of doing business typically focuses on one product at a time, discount retail items, services or special promotions that are offered in either a limited quantity or for a limited period of time. These special offers are typically made available for 24 hours or for a specified timeframe to incent competitive, viral and timely customer purchasing to capitalize on the significant savings or value.

Certain sites sell items uniquely through this method and provide varying offers amongst different geographic locations. Other established retailers, such as Buy.com and eBay.com feature an online "deal a day" item in addition to a more conventional sales method. This specific model originated on the internet with the launching of Woot.com in July 2004. By late 2006, it had exploded with more than 100 deal-a-day sites. Newer companies like Groupon, Homerun, Ideeli and many others continue to facilitate a broad range of offerings for online customers to participate and purchase products or services at a greatly reduced cost.

Operating under this model, deal-a-day customers must be aware of an offering, react quickly or sometimes impulsively to partake in these special offerings before the limited quantity or time fully expires. Sales and growth highly depends upon a certain type of consumer behavior that is expected to occur. Businesses that operate successfully within this realm understand the importance of dealing with the human psychology factors as well as the portrayal of perceived scarcity.

While there are many widely used tactics and accepted practices to this established business model, the current mechanics and implementation utilized for the technical promotion, delivery and status quo customer checkout process offered to consumers lacks significant innovation and enhanced consumer capability.

Amongst the hundreds of established companies incorporating this strategic business process, the applied method of delivery, promotion and purchasing of these offerings has been limited to conducting this type of business in an online fashion only. Each customer must actively engage the platform of their choice from within required parameters to receive, participate and purchase offers.

For example, buyers who currently wish to engage in these special offers must do so by utilizing an online internet connection, SSL and a device that supports both. The typical process requires that each customer connect to the internet, select a desired web address via the World Wide Web using a desktop computer, laptop computer, iPad, Tablet PC, WAP mobile application, etc.

Thus, it is desirable to provide a system and method for enabling global and remote flash sale or daily deal commerce through unsecured electronic channels and it is to this end that the disclosure is directed.

DETAILED DESCRIPTION OF ONE OR MORE EMBODIMENTS

The disclosure is particularly applicable to a system that is implemented using the disclosed hardware and software described below and it is in this context that the disclosure will be described. It will be appreciated, however, that the system and method has greater utility since the disclosed implementations are merely illustrative examples of the system and its operation.

The system provides an innovative and new standard that not only enhances consumer convenience but also solves a large shortcoming by providing customers an alternative to online electronic purchasing for these types of offers. The system and method allows customers to receive and instantly purchase special offers in an entirely off-line fashion. Global customer transactions can be conducted completely independent of a buyer's physical location, access to an online internet connection or use of SSL. This kind of improvement has not yet been applied or included in the well-established deal-a-day model. Transacting specialty time-limited or quantity sensitive customer offers in this method is partially accomplished by assembling a unique formulation of existing elements currently being used for other purposes. The system and method leverages an offline technology used in combination with a consumer's unique Personal Identification Number matching the consumers cellular telephone number. A matching combination of a valid customer's account, Personal Identification Number (PIN) and cellular phone number can be used to instantly receive, purchase and checkout using the platform of the system.

Figure 1:
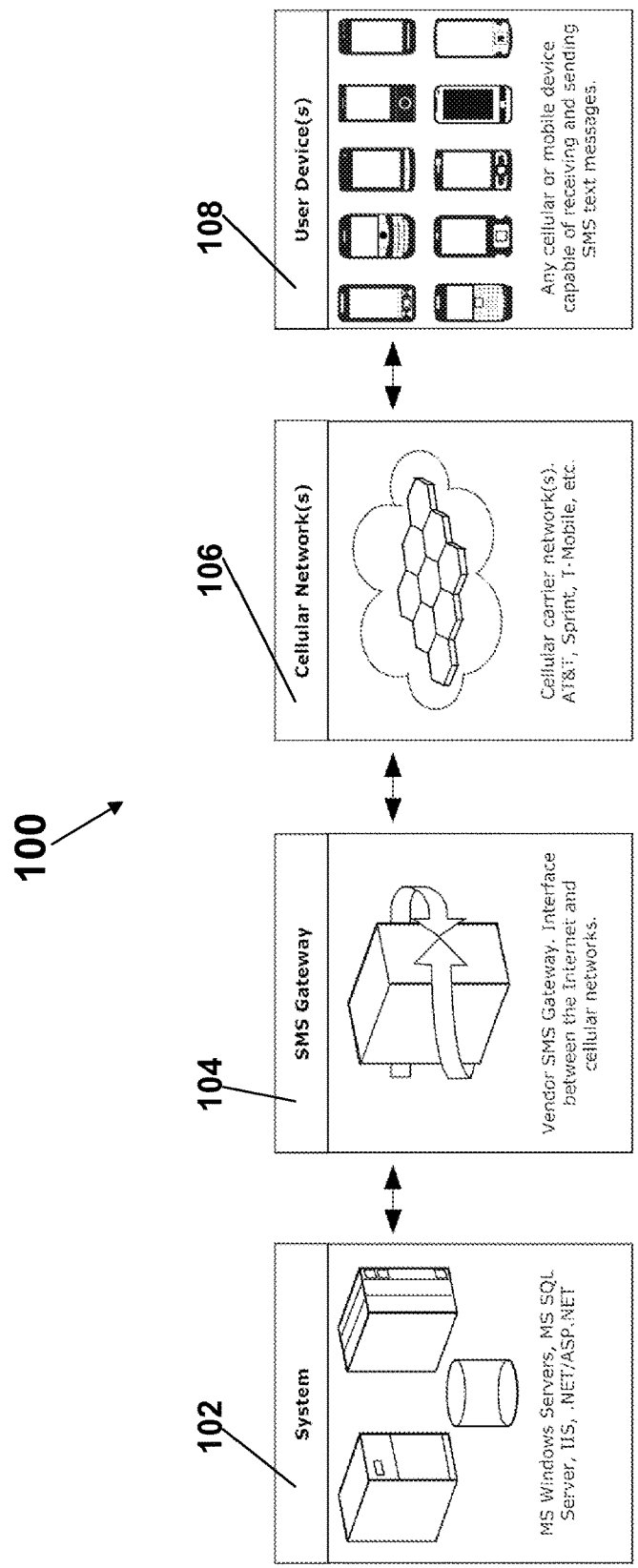
FIG. 1 illustrates an example of an implementation of a system for enabling global and remote flash sale or daily deal commerce through unsecured electronic channels.

FIG. 1 illustrates an example of an implementation of a system 100 for enabling global and remote flash sale or daily deal commerce through unsecured electronic channels. The system may include the flash sale system 102, an short messaging system (SMS) gateway 104, a link 106 an one or more user computing devices 108 that are all interconnected to each other using the link 106 to implement the system 100 for enabling global and remote flash sale or daily deal commerce through unsecured electronic channels. The flash sale system 102 may include one or more Microsoft® Windows servers, one or more Microsoft® SQL servers, an IIS system and .NET/ASP.NET software that executes on the servers. Thus, in one implementation, the flash sale system 102 is one more server computers (with known components such as one or more processors, memory, connectivity, an operating system, etc.) that execute a plurality of lines of computer code that implement the system functions and operations described below. The SMS gateway 104 is a commercially available SMS gateway that interfaces between the link and the Internet, for example as is well known in the art. The link 106 may be various communication networks and systems, such as cellular networks as shown in FIG. 1, but may also be other forms such as the Internet, a digital data network and the like as the system is not limited to any particular link. Each of the one or more user computing devices 108 may a processing unit based device with memory, connectivity (wired or wireless), a display and SMS text messaging capabilities. For example, each user computing device may be a smartphone device (for example, Apple® iPhone, RIM® Blackberry device, Android based device, etc.), a cellular phone device with SMS capabilities, a computer with SMS capabilities or other computing devices that have unsecured channel communication capabilities. For example, the system may also be implemented with an unsecured channel that is multimedia messaging system (MMS), instant messaging (IM) and voice over IP (VoIP) that operate in the same manner as described below in the SMS example. In addition, the system may also be implemented with an unsecured channel that is an automated voice response system or interactive voice response system (IVR) in which the user would speak/say the secured PIN instead of sending it as data as described below.

Figure 2:
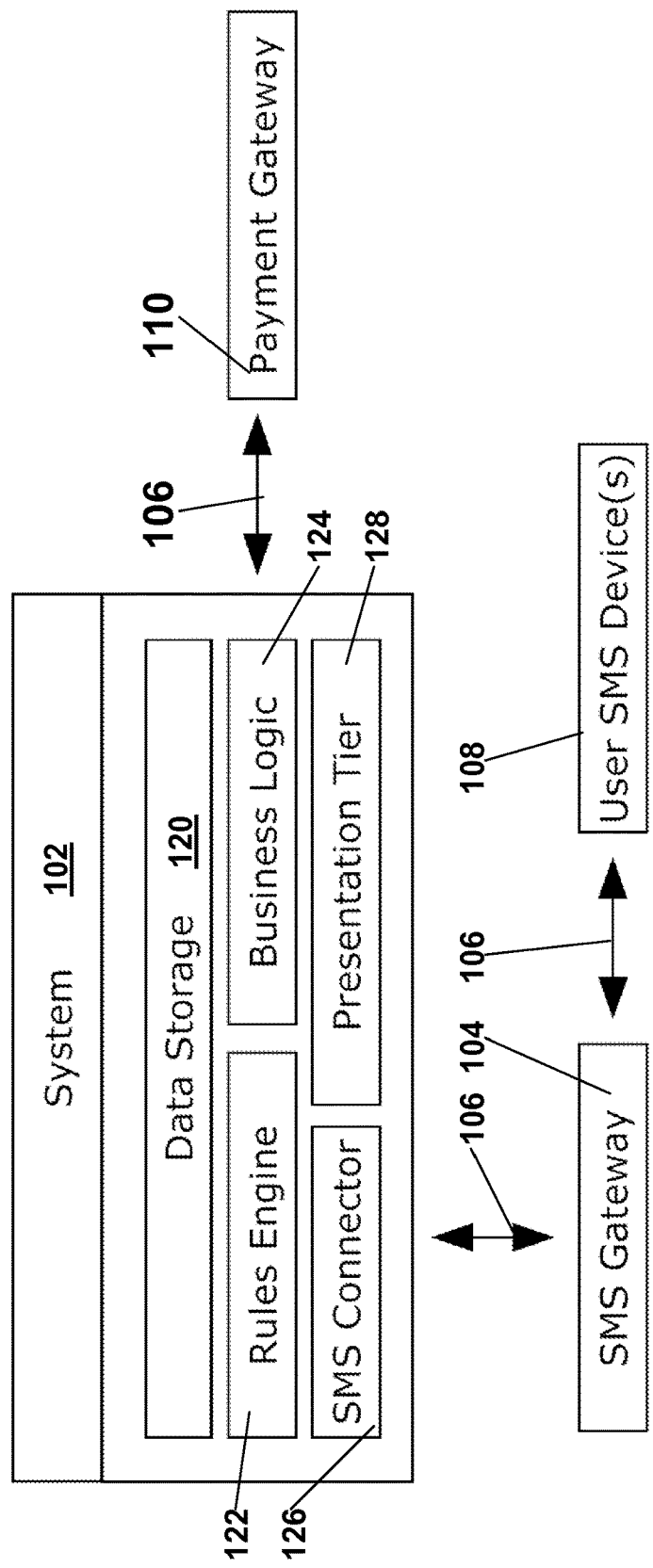
FIG. 2 illustrates more details of the system shown in FIG. 1.

FIG. 2 illustrates more details of the system 102 shown in FIG. 1 and shows the link 106, the user computing devices 108 and the SMS gateway 104 from FIG. 1 coupled to the flash sale system 102 wherein each user computing device 108 is coupled to the flash sale system 102 through the SMS gateway 104. A payment gateway 110 is also coupled to the flash sale system 102 over a link 106 and handles the payment transaction that occur when a flash sale is completed. The details and components of the payment gateway are known in the art and are not described in more detail herein. The flash sale system 102 may further comprise a data storage unit 120, such as a hardware or software based database, that stores the data used by the flash sale system such as data about each user and the like as described in more detail below with reference to FIG. 6. The flash sale system 102 may further comprise a rules engine 122, business logic 124, an SMS connector 126 and a presentation tier 128 which each may be implemented in software in one embodiment, but may also be implemented in hardware as well. The rules engine 122 contains rules that govern what flash sales are provided to each user based on each user's parameters as described below in more detail, the business logic 124 contains the functional processes that handle the information exchange between a database and a user interface, the SMS connector 126 is known in the art and interfaces between the data and protocols of the flash sale system 102 and the SMS gateway 104 and the presentation tier 128 generates and presents flash sale user interfaces to each user computing device and receives information back from each user computing device during a flash sale event. The flash sale system 102 also has a validation unit (not shown) that validates the secured PIN as described below and may be implemented in software in one embodiment, but may also be implemented in hardware as well.

Figure 3:
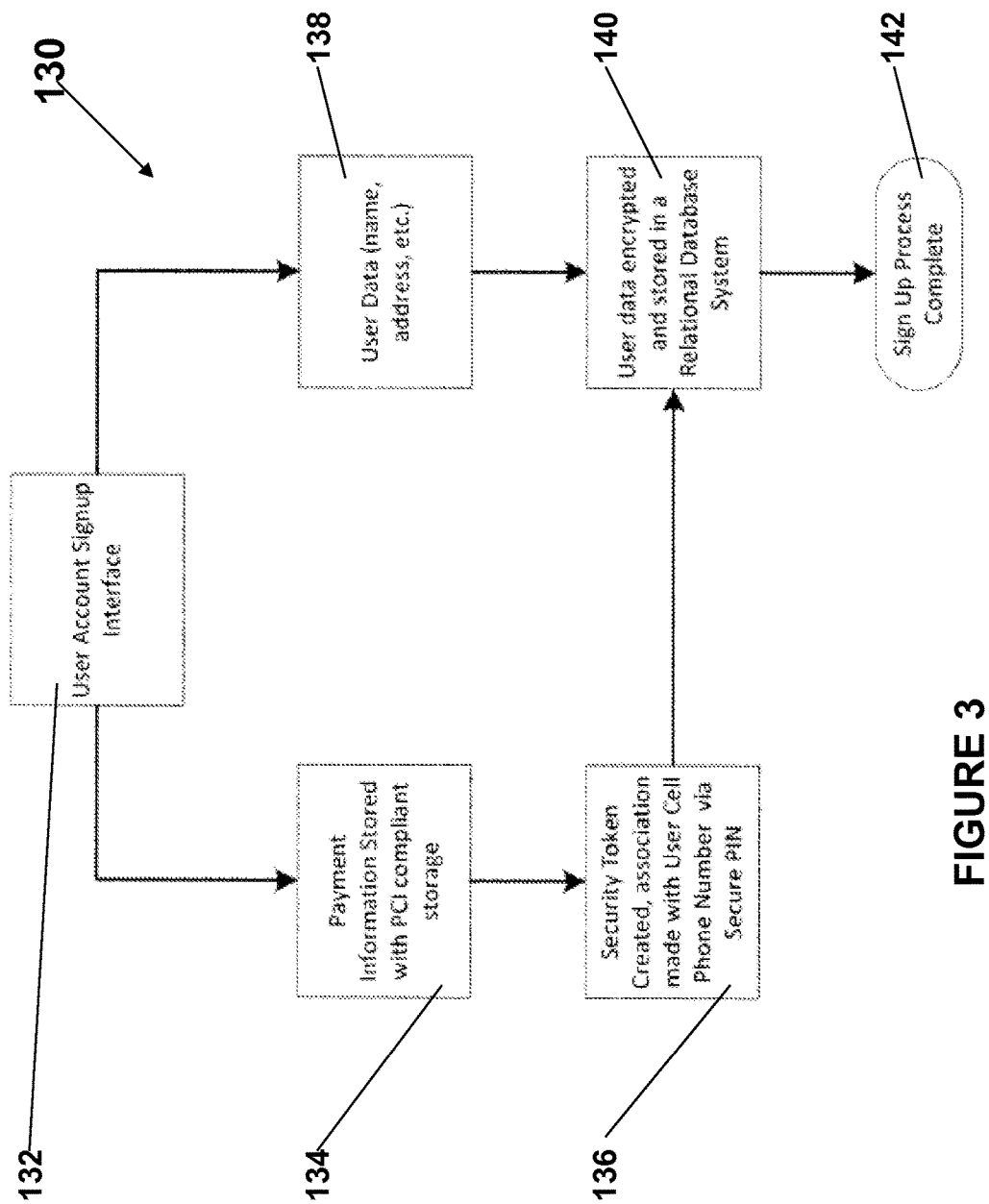
FIG. 3 is a flowchart representation of a secure signup process for the system in FIGS. 1 and 2.

FIG. 3 is a flowchart representation of a secure signup process 130 for the system in FIGS. 1 and 2 as well as storage of transaction data by the system. During the process, the business logic and presentation tier of the flash sale system 102 perform the processes described below. Initially, a user interface (132) for collection of user data (138), persistent payment data in a secure storage mechanism (134), and generation of a security token that associates the persistent payment information with a Secure PIN and the User's phone number (136) via a SHA-256 HASH value is presented to the user. The user data is stored encrypted in the data storage 120 of the system (140). The data gathered is secured via AES symmetric encryption protocols, utilizing a secret key. The secure PIN is utilized by the system 102 to perform a real-time unlocking of the payment data. This unlocking is done on a transactional basis, and can only be done on validation of the Security Token and PIN. The authentication token is preferably related to an SMS-capable user computing device associated with a single user.

In more detail, upon registration, each account holder/user selects a personalized Secure Buying PIN (secure PIN) for identification purposes in connection with completing future purchases or transactions and utilizing the transactional platform of the system. The user/account holder's Secure Buying PIN may be modified, changed or adjusted within the user administration section. In order to complete purchases through the system, the correct Transactional Method must be followed.

Figure 4:
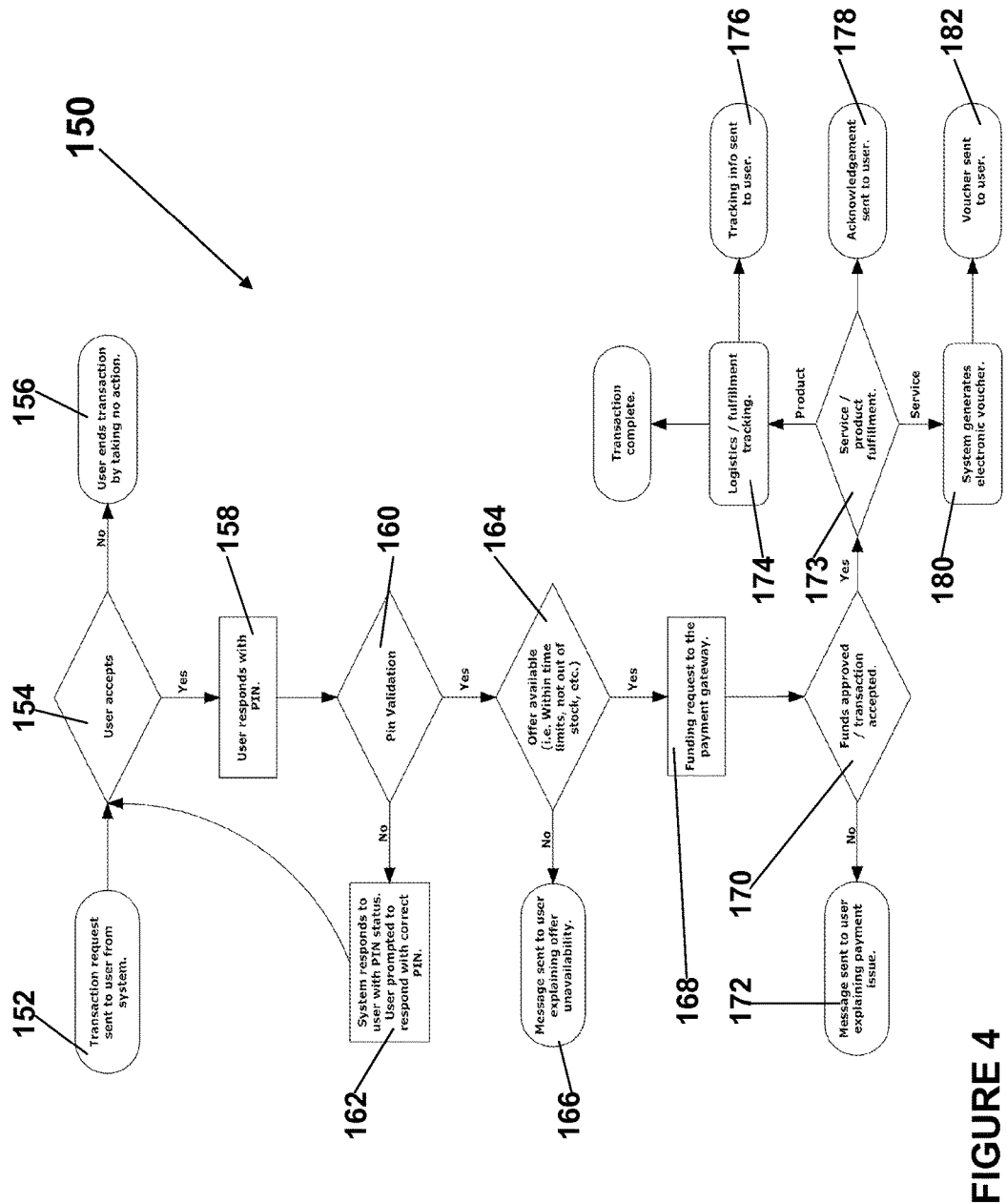
FIG. 4 is a flowchart illustrating a method for enabling global and remote flash sale or daily deal commerce through unsecured electronic channels including a "deal of the day" transaction.

FIG. 4 is a flowchart illustrating a method 150 for enabling global and remote flash sale or daily deal commerce through unsecured electronic channels including a "deal of the day" transaction for each user. The method includes the processes of a Transaction Request being sent to a User over SMS; a User authorizing the Transaction Request by entering their Secure PIN on their user computing device and responding to the Request; and the request being validated by the back-end systems. The processes shown in FIG. 4 may be performed by the user with the user computing device and by the flash sale system described above.

Figure 7:
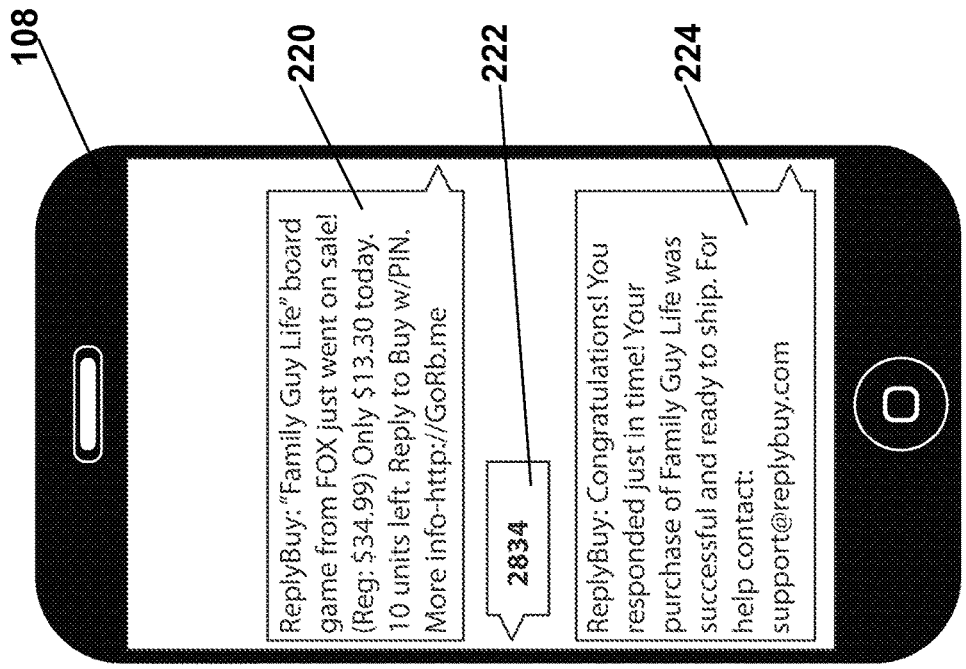
FIG. 7 illustrates an example of a user interface of a user device when participating in a remote flash sale through unsecured electronic channels using the system.

In the first process, the flash sale system (using the presentation tier) sends a particular user a transaction request (flash sale offer for a product and/or service) (152). An example of the user interface of the user computing device in response to such a transaction request is shown in FIG. 7. If the user does not accept the transaction request, the user ends the transaction by taking no action (156) and the process is completed until another transaction request from the system is sent to the user. If the user accepts the transaction request (154), the user responds to the transaction request with a personalized Secure Buying PIN (158) associated with the account of the user. When the buyer responds with the secure personalized Secure Buying PIN, the Secure PIN is then examined, cross-referenced and validated (160) through the PIN Validation process within the system.

The PIN Validation process of the Transaction Method is a two-tiered authentication mechanism. The first tier is validating the requesting address, in this case the User's 10-digit user computing device phone number. The second tier is validating the User entered Secure PIN against the stored Security Token, which as mentioned above comprises a SHA-256 Hash Value of the Secure PIN and Cellular Phone Number. The stored security token may be any unique, non-repeating alphanumeric string. In this way, the integrity of the Transaction can be maintained over the open channel.

Returning to FIG. 4, if the PIN Validation fails, the account holder is issued a corresponding message (162) and returned to the acceptance process (154). If a successful PIN Validation occurs, then the flash sales system confirms that the particular transaction is still available (e.g., within the time limits, not out of stock, etc.) If the particular transaction is not available, a message is sent to the user (166). If the particular transaction is still available, the transaction is unlocked, the User's payment information is temporarily available through a PCI compliant partner and a funding request is made of the payment gateway (168) that processes the transaction based on a credit card that the user has on file with the payment gateway. The stored persistent payment data is authorized and the system determines if the funds were approved/transaction accepted (170). If the funds were not approved, then a message is sent explaining the payment problem (172). If the funds were approved, the system determines if it is a service or product fulfillment (173) and an acknowledgement is sent to the user (178). If it is a product fulfillment, the system performs logistics and fulfillment tracking (174), the transaction is complete and the tracking information is sent to the user (176) via email or text message. If it is a service fulfillment, the system generates an electronic voucher for the service (180) and the voucher is sent to the user (182) via email or text message.

As mentioned above, the method above is used for time or quantity limited transactions, such as those that exist in a "deal-of-the-day" transaction. In the event that the transaction is disabled due to its limited nature, the transaction will be denied before funds are approved and transferred.

An alternative embodiment implements the above method in a non-Cellular Phone based manner preferably executed over unsecured channels such as electronic mail.

An alternative method for using the Secure Buying PIN may be as follows:
1. An account holder or User receives a message containing item(s) or offer(s) available for purchase through the System and a provided Keyword associated with the item(s) or offer(s).
2. If the account holder or User chooses to purchase the item received, they must respond to the message using a personalized Secure Buying PIN associated with their User account and the Keyword provided in the message.
3. When the buyer responds utilizing their personalized Secure Buying PIN and the correct Provided Keyword, the Secure PIN and Provided Keyword are then examined, cross-referenced and validated through the PIN Validation process within the system.
4. PIN Validation of the Transaction Method is a two-tiered authentication mechanism. The first tier is validating the requesting address, in this case the User's 10-digit Cellular Phone number. The second tier is validating the User entered Secure PIN against the stored Security Token, which as mentioned above comprises a SHA-256 Hash Value of the Secure PIN and Cellular Phone Number. In this way, the integrity of the Transaction can be maintained over the open channel.
5. Once the PIN Validation process is completed, one of the following events occur.
6. If successful PIN Validation and Keyword Validation occur the transaction is unlocked, the User's payment information is temporarily available through a PCI compliant partner. The stored persistent payment data is authorized, and on a successful authorization of funds, goods and or services are released to the user.
7. If the PIN Validation or Keyword Validation fail, the account holder is issued a message with the corresponding information.

Figure 5:
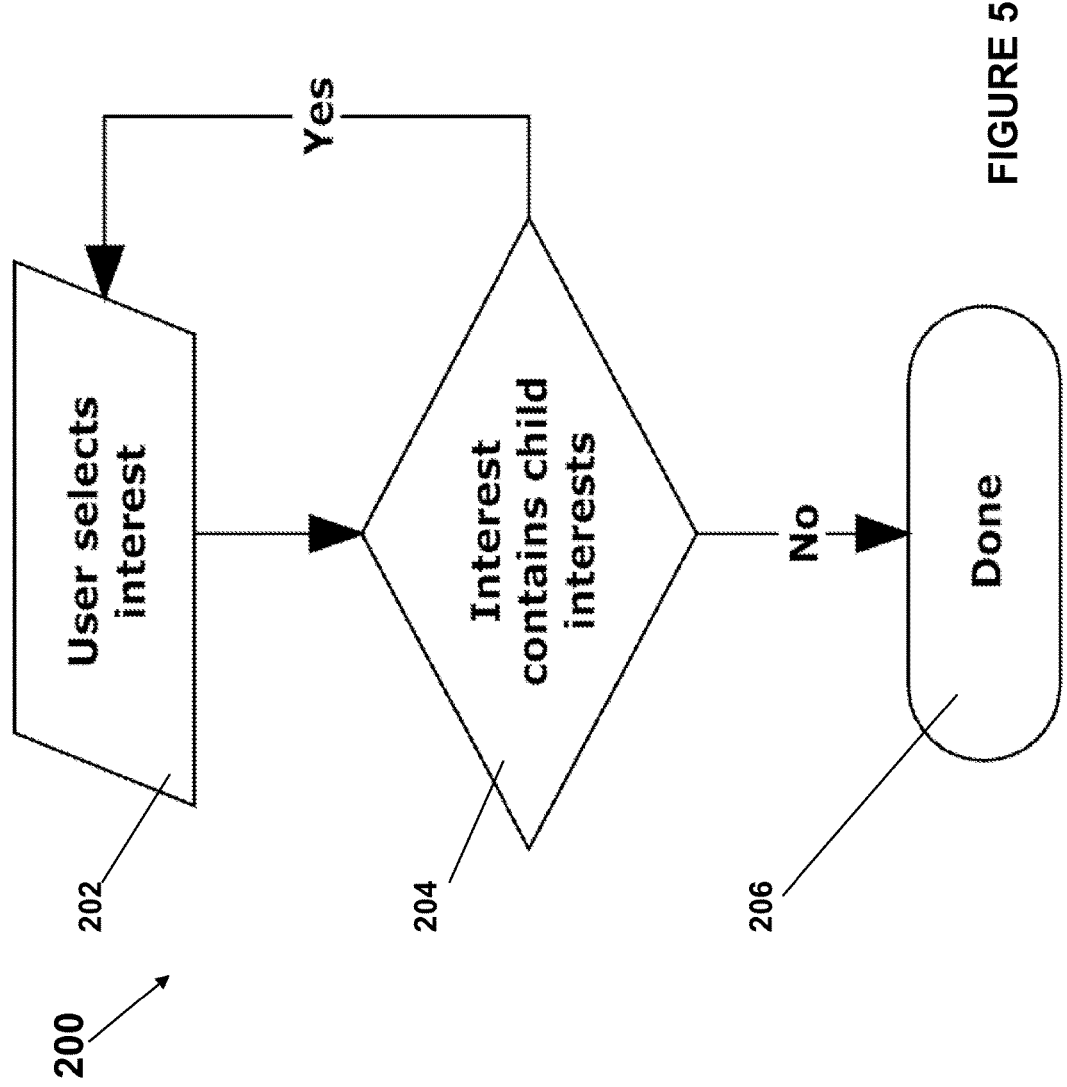
FIG. 5 illustrates a method for selecting a product interest and related interests by the user of the system.

FIG. 5 illustrates a method 200 for selecting a product interest and related interests by the user of the system. In particular, when a user registers with the system, the system determines the products and services in which the user is interested. To accomplish this, the user selects his/her interests (202), such as cars, sports, etc. and then the system determines, for each selected interest, if the interest has child interests (204) and add those child interests to complete the one or more interests of the user for the deals. For example, the interests may be Electronics, Housewares, Fashion, Software and Tickets (although the system is not limited to any particular types of products/services that are represented by the interests). Examples of the child interests (for the exemplary interests above) may be: Electronics→Home Theater→Audio Equipment; Housewares→Cutlery; Fashion→Shoes→Men→Casual; Software→Anti-Virus/Spyware; and Tickets→Phoenix→Sports→Pro Football.

In addition to the method described above, the system also may perform a direct one-to-one match of the users chosen interests/categories and the interest/category assigned to the service/item. Alternatively, the system may use a fuzzy match to other items/services previously purchased or otherwise shown interest in, match to keyword(s)/tag(s) data assigned to the item with interest selected by the user and/or match based any of the above to associated/"friended" users' settings/preferences.

Figure 6:
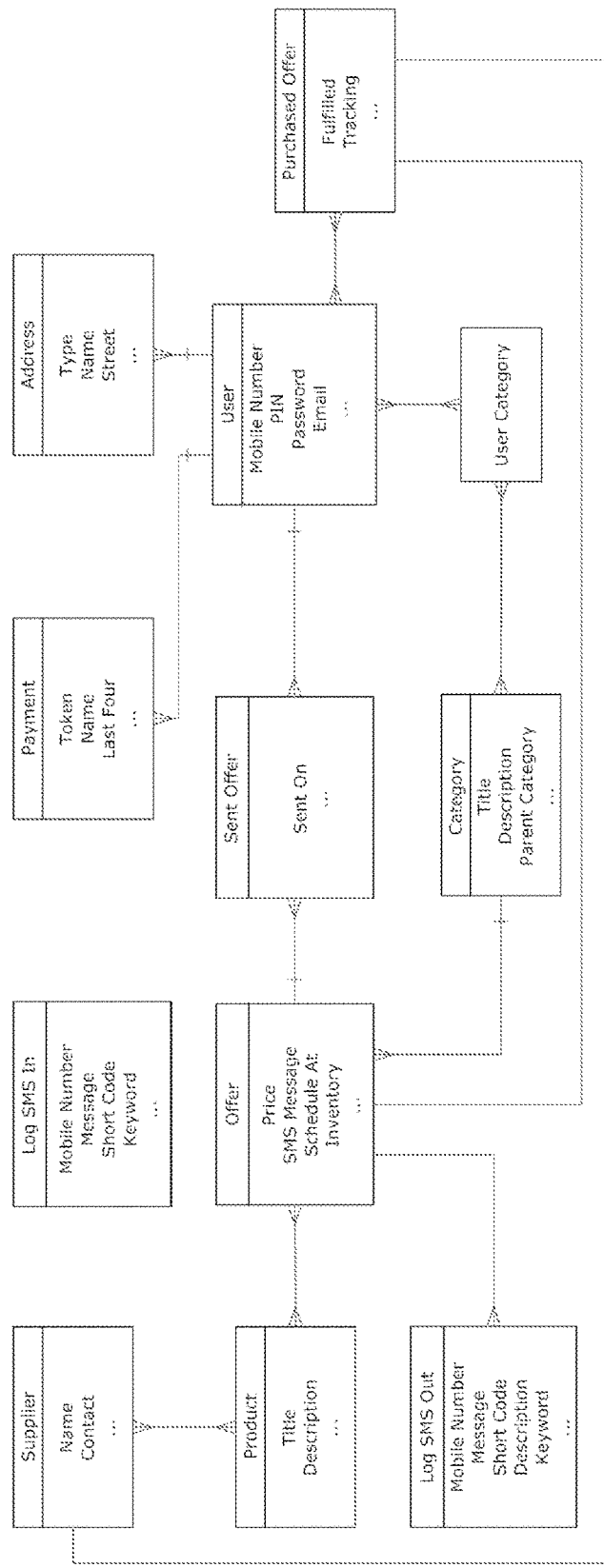
FIG. 6 illustrates an example of a database schema that supports the implementation of the system shown in FIG. 2 and may be stored in the data storage of the system.

FIG. 6 illustrates an example of a database schema that supports the implementation of the system shown in FIG. 2 and may be stored in the data storage of the system. In the example in FIG. 6, the database is stored in one or more tables wherein each table has an identifier as shown in FIG. 6. Each table then has one or more data fields as shown in FIG. 6.

FIG. 7 illustrates an example of a user interface of a user device 108 (when SMS texts are used for the communication) when participating in a remote flash sale through unsecured electronic channels using the system. In particular, the offer user interface 220 that is delivered to the user is shown, the PIN user interface 222 sent back to the system is shown and the system transaction complete user interface 224 is shown. In the example shown in FIG. 7, the offer user interface shows: "Family Guy Life" board game from FOX just went on sale! (Reg: $34.99) Only $13.30 today. 10 units left. Reply to Buy w/PIN. More info-http://GoRb.me. The transaction complete user interface may show: "Congratulations! You responded just in time! Your purchase of Family Guy Life was successful and ready to ship. For help contact: support@replybuy.com.

If the transaction fails when purchase is attempted, the system may display: "Awe nuts! We're sorry, but the special offer of Family Guy Life has already sold out. Better luck next time! Your payment info has not been charged." Furthermore, if there is no payment information, the system displays: "Ah Shucks! We need payment info on file to process your order. Please update your member account for future purchasing. http://replybuy.com." If there is a PIN/payment issue, the system displays: "Oops! Sorry, we don't recognize this PIN or there's an issue w/ your payment info. Login to verify or update your acct info. Help? support@replybuy.com"

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for purchasing items over an unsecured electronic channel, the system comprising:
   one or more user computing devices, each user computing device having a display, an input device and an unsecured electronic channel communicator that provides the capability to communicate data over the unsecured electronic channel;
   a storage system that stores payment data for a user and a phone number of the user computing device;
   a computer based flash sale system coupled to each user computing device over a link that is an unsecured electronic channel that is not an Internet connection, the computer based flash sale system generating a security token, unique to the user of the user computing device, the security token being a non-repeating alphanumeric string that is a cryptographic hash of a secured identifier for the user and the phone number of the user computing device of the user, encrypting the payment data of the user using the token, generating a transaction request for purchase of an item communicated to the user computing device using the unsecured electronic channel communicator and displayed to the user on the display of the user computing device, receiving, using the unsecured electronic channel communicator of the user computing device, the secured identifier input by the user using the input device of the user computing device in response to the transaction request over the unsecured electronic channel when the transaction request from the computer based flash sale system is accepted; and
   the computer based flash sale system having a validation unit that performs two-tiered authentication of a payment for the accepted transaction request by validating the phone number of the user computing device received by the computer based flash sale system during the acceptance of the transaction request and validating the secured identifier against the security token, the validation unit generates a funding request through a partner to a payment gateway when the secured identifier is validated and the validation unit decrypts and unlocks the encrypted payment data using the secured identifier and approves funds for the transaction request;
   the payment gateway coupled to the computer based flash sale system that processes the funding request using a funding source of the user stored at the payment gateway; and
   wherein the user computing device is configured to display a transaction complete message on the display after the funding request is processed.

2. The system of claim 1, wherein the computer based flash sale system further comprises a presentation tier that generates the transaction request for a particular user and sends the transaction request for the particular user to the user computing device of the particular user.

3. The system of claim 1, wherein the payment gateway handles a payment transaction for a particular user.

4. The system of claim 1, wherein the unsecured electronic channel further comprises an short message system (SMS) channel.

5. The system of claim 4 further comprising an SMS gateway connected to the flash sale system that interfaces between the one or more user computing devices and the flash sale system.

6. The system of claim 1, wherein the item is one of a product and a service.

7. The system of claim 1, wherein the security token for the particular user is a SHA-256 Hash Value of the Secured identifier and a phone number of the particular user.

8. A method for purchasing items over an unsecured electronic channel using one or more user computing devices, the method comprising:
   storing, in a storage system, payment data and a phone number of a user computing device for a user of the user computing device;
   generating, by the computer based flash sale system, a security token unique to the user of the user computing device, the security token being a non-repeating alphanumeric string that is a cryptographic hash of a secured identifier for the user and the phone number of the user computing device of the user;
   encrypting, by the computer based flash sale system, a piece of payment data of the user using the security token;
   generating, by the computer based flash sale system, a transaction request for purchase of an item communicated to the user computing device using an unsecured electronic channel communicator of the user computing device that provides the capability to communicate data over the unsecured electronic channel and displaying the transaction request to the user on a display of the user computing device;
   receiving, by the computer based flash sale system coupled to the unsecured electronic channel communicator of the user computing device over the unsecured electronic channel that is not an Internet connection, the secured identifier input by the user using an input device of the user computing device in response to the transaction request when the transaction request from the flash sale system is accepted;
   performing, by the computer based flash sale system, two-tiered authentication of a payment for the accepted transaction request by validating the phone number of the user computing device received by the computer based flash sale system during the acceptance of the transaction request and validating the secured identifier against the security token;

generating, by the computer based flash sale system, a funding request through a partner to a payment gateway when the secured identifier is validated;

decrypting and unlocking, by the computer based flash sale system, the encrypted payment data using the secured identifier and approving the funds for the transaction request;

processing, by the payment gateway the funding request using a funding source of the user stored at the payment gateway; and displaying a transaction complete message on the display after the funding request is processed.

9. The method of claim 8 further comprising generating, by a presentation tier of the computer based flash sale system, the transaction request for a particular user and sending the transaction request for the particular user to the user computing device of the particular user.

10. The method of claim 8, wherein the payment gateway associated with the computer based flash sale system handles a payment transaction for a particular user.

11. The method of claim 8, wherein the unsecured electronic channel further comprises an short message system (SMS) channel.

12. The method of claim 8, wherein the item is one of a product, a service and information.

13. The method of claim 8, wherein the security token for the particular user is a SHA-256 Hash Value of the Secured identifier and a phone number of the particular user.

\* \* \* \* \*